(12) United States Patent
St. Jacques

(10) Patent No.: US 8,866,393 B2
(45) Date of Patent: Oct. 21, 2014

(54) LOW VOLTAGE SYSTEM AND METHOD

(75) Inventor: Richard St. Jacques, Ottawa (CA)

(73) Assignee: Rimikon, Inc., Ottawa, Ontario (CA)

( * ) Notice: Subject to any disclaimer, the term of this patent is extended or adjusted under 35 U.S.C. 154(b) by 32 days.

(21) Appl. No.: 13/439,441

(22) Filed: Apr. 4, 2012

(65) Prior Publication Data

US 2013/0093336 A1 Apr. 18, 2013

Related U.S. Application Data

(60) Provisional application No. 61/472,026, filed on Apr. 5, 2011.

(51) Int. Cl.
*H05B 37/02* (2006.01)
*H02J 3/00* (2006.01)
*H05B 33/08* (2006.01)

(52) U.S. Cl.
CPC .............. *H05B 37/02* (2013.01); *H05B 33/086* (2013.01); *H05B 33/0815* (2013.01); *H02J 3/00* (2013.01)
USPC ............ 315/161; 315/294; 315/291; 307/29; 307/31

(58) Field of Classification Search
None
See application file for complete search history.

(56) References Cited

U.S. PATENT DOCUMENTS

| | | | |
|---|---|---|---|
| 8,319,449 B2* | 11/2012 | Hoogzaad et al. | 315/291 |
| 2008/0150449 A1* | 6/2008 | Wang et al. | 315/291 |
| 2010/0019697 A1* | 1/2010 | Korsunsky et al. | 315/307 |
| 2010/0148679 A1* | 6/2010 | Chen et al. | 315/185 R |
| 2011/0148314 A1* | 6/2011 | Lin et al. | 315/192 |

OTHER PUBLICATIONS

Official Action for Australian Patent Appln. No. 2012201949, Mar. 28, 2014.

* cited by examiner

*Primary Examiner* — Crystal L Hammond
(74) *Attorney, Agent, or Firm* — Duane Morris LLP

(57) ABSTRACT

Low voltage systems and methods, as well as a light assembly and LED driver are provided. In one aspect, a low voltage system is provided that is capable of drawing power from a power source having a first voltage, the system having at least one low voltage power supply connectable to the power source and having an output providing a second voltage that is lower than the first voltage. The system further has at least one low voltage load and circuit means connecting the output of the power supply to the at least one low voltage load. The at least one load can be a light assembly, and the light assembly can comprise one or more light emitting diodes (LEDs). Also provided is an LED driver that provides for one or more improved dimming characteristics. A light assembly employing the LED driver is also provided.

14 Claims, 7 Drawing Sheets

LOW VOLTAGE SYSTEM AND METHOD

CROSS-REFERENCE TO RELATED APPLICATIONS

This application claims priority of U.S. Provisional Patent Application No. 61/472,026, filed Apr. 5, 2011, which is hereby incorporated by reference.

FIELD OF THE DISCLOSURE

The present invention relates to electrical circuits and systems, and in particular to low voltage circuits, systems and components, as well as LED drivers.

BACKGROUND

The voltage level of grid power has been standardized in many countries. In Canada and the U.S., power grids typically supply alternating current at approximately 120 volts (V). In many European countries, electricity supplies are 230V. The voltage level in most other counties falls somewhere in the range of 100 V to 240 V.

In many jurisdictions, local regulations impose restrictions relating to electrical work including the installation, modification, and other work performed on electrical systems. For example, in some locales, only certified or registered electricians may perform certain types of work. The distinction is usually related to the degree of danger involved with the work. In other instances, lay persons may perform specific electrical work. However, often permits and/or inspections will be required to ensure that the work has been carried out to code and that approved equipment has been used. In other instances, the type of work may not necessitate a permit or an inspection. For example, this may be the case where the work involves a low voltage system. In such an instance, a lay person would be allowed to install or perform work on an electrical system so long as the system operates below a threshold voltage. The ability of a lay person to install his or her own low voltage system can provide several benefits. For example, it can reduce the time, cost, inconvenience and/or complexity of having the system installed by an electrician or having to obtain permits and inspections.

For the foregoing reasons, it can be appreciated that a need exists for a low voltage system that can be installed, modified, or otherwise worked on without requiring any permits or inspections, or the services of a certified or licensed electrician.

In addition, some existing LED (light emitting diode) drivers allow for the dimming of one or more LEDs. However, the dimming characteristics of many of these LED drivers could be improved. For example, some existing dimmable LED drivers provide dimming in only a narrow band of the controlling input voltage and/or current range. Another deficiency of many dimmable LED drivers is that the drivers could be more power efficient. Thus there is also a need for a dimmable LED driver that provides for one or more improved dimming characteristics. There is also a need for an LED light assembly that employs such a dimmable LED driver.

SUMMARY

In one aspect, the present disclosure is directed to a low voltage system capable of drawing power from a power source having a first voltage, the system having at least one low voltage power supply connectable to the power source and having an output providing a second voltage that is lower than the first voltage. The system further has at least one low voltage load and circuit means connecting the output of the power supply to the at least one low voltage load.

Another aspect of the present disclosure is directed to a method for providing a low voltage system, the method comprising the steps of electrically connecting an input of a power supply to a power source having a first voltage, electrically connecting an output of the power supply to at least one electrical load by way of circuit means, the output providing a second voltage that is lower than the first voltage.

BRIEF DESCRIPTION OF THE DRAWINGS

The present disclosure will be better understood having regard to the drawings in which.

DETAILED DESCRIPTION

Figure 1:
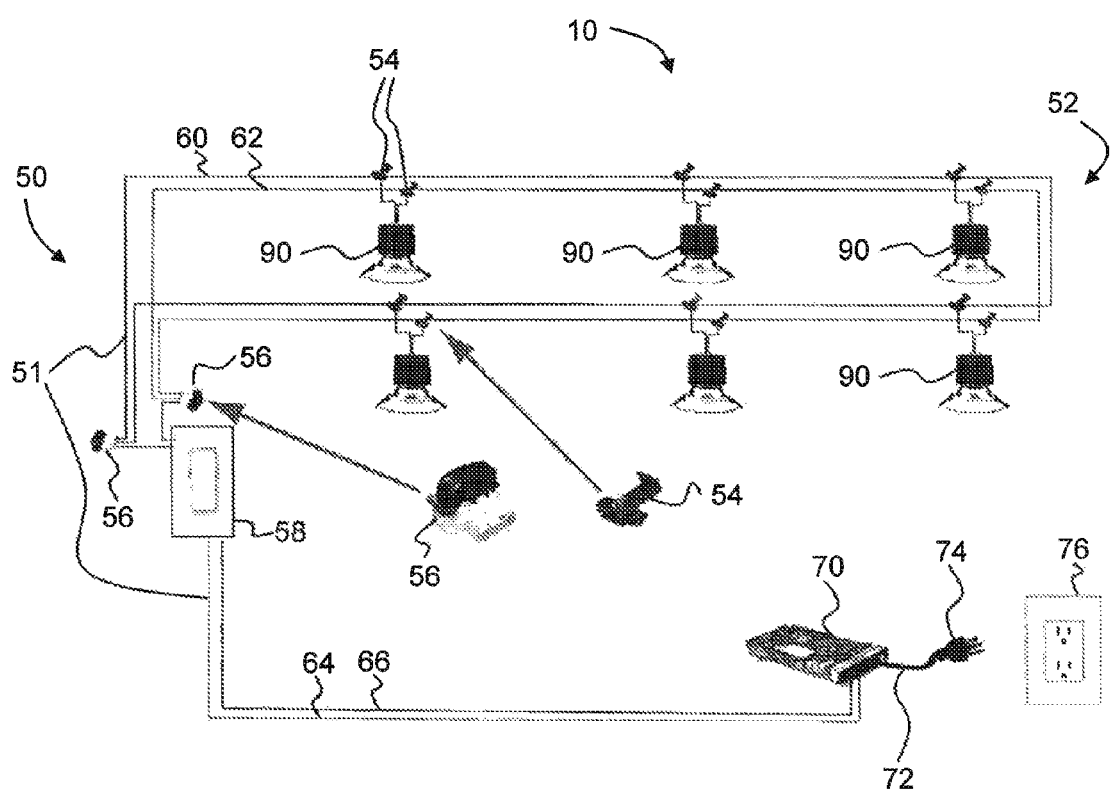
FIG. 1 is a schematic view of one embodiment of the present system.

The present system, method, light assembly, and LED driver are described in embodiments in the following disclosure with reference to the Figures. While the system, method, light assembly, and LED driver are described having reference to the particular embodiments described herein, the scope of the present disclosure is not intended to be limited to these embodiments.

The present system generally comprises at least one low voltage power supply, at least one low voltage light assembly, and circuit means for electrically connecting the at least one low voltage power supply and the at least one low voltage light assembly. The circuit means interconnecting the output of the low voltage power supply and the one or more light assemblies will be in the form of one or more low voltage circuits. The input of the low voltage power supply is connectable to a source of electricity, such as grid power.

The expression "low voltage" as used herein is not intended to refer to a single, specific voltage threshold or range. However, for the purposes of describing the following embodiments, the expression will generally be used to mean a voltage of 80 V or less. However, it is contemplated that the present system can also operate at a voltage above 80 V.

Furthermore, although the present low voltage system is described in terms of a low voltage lighting system, it is to be appreciated, however, that the present system can be used in and for other applications, and is not intended to be limited to lighting systems. In particular, the present system may be used to power one or more other types of low voltage loads.

In at least one embodiment, the low voltage power supply will be capable of producing an output voltage that is lower than its input voltage. For example, in at least one embodiment, the input of the supply will be connected to a grid power source having a particular voltage (e.g. 120 V in Canada and the U.S.). In this example, the power supply will provide an output voltage that is below its input voltage. Furthermore, in at least one embodiment, the system will have at least one AC to DC converter for transforming AC grid power into DC. The AC to DC converter can be positioned in or at the power supply. Another option is to position an AC to DC converter at each low power light assembly. Yet another option is to position one or more AC to DC converters at suitable locations in the one or more circuits connected to the output of the low voltage power supply so long as every light assembly only sees DC. As will be appreciated, an AC to DC converter will only be necessary where the power source (e.g. grid power) is AC and at least one light assembly requires DC. In another case, the power source could be DC and a light assembly could require AC current. In such a case, a DC to AC converter would be required.

The at least one low voltage power supply is electrically connected to at least one low voltage light assembly by way of circuit means. In at least one embodiment having two or more light assemblies, at least some of the light assemblies will be electrically connected to the power supply in parallel. However, other circuit configurations are possible, such as in series.

Each light assembly generally comprises one or more lighting elements. A lighting element may be of any suitable type, including but not limited to light emitting diode (LED), incandescent, halogen, and fluorescent. A light assembly may also have a transformer or modifier for modifying the characteristics (e.g. current, voltage, etc.) of the power on the low voltage circuit. For example, the voltage of the low voltage circuit may need to be further stepped down, or perhaps the current to the one or more lighting elements needs to be regulated. In the case where one or more lighting elements of a light assembly are LEDs, the transformer can be in the form of an LED driver. In general terms, an LED driver has its outputs configured to match the input characteristics of one or more LEDs. This ensures that the LED receives power having characteristics falling within its operational ranges. An LED driver can also enable the desired operation of the LED (e.g. colour, intensity, etc.). An LED driver may perform other functions, as will be appreciated by those skilled in the art. For example, these other functions include controlling and dimming of one or more LEDs.

The various features and components of the present low voltage system and method, and the light assembly and LED driver are now described with reference to the Figures.

FIG. 1 shows one embodiment of the present system. The system 10 generally comprises a low voltage power supply 70, at least one but more typically a plurality of low voltage light assemblies 90, and circuit means 50 for electrically connecting the power supply and the plurality low voltage light assemblies. It is to be appreciated, however, that other embodiments of the present system can have multiple low voltage power supplies.

An input of low voltage power supply 70 can be connected to a source of power, such as electrical outlet 76. However, it is to be understood that power supply 70 can be connected to any other suitable power source. In the present example, outlet 76 is connected to a 120 V source, 120 V being the standardized nominal grid voltage in Canada and the U.S. Input line 72 of the power supply can be terminated with a typical three-prong plug 74 to allow it to be easily plugged into conventional outlet 76. However, power supply 70 can be connected to a power source by any other suitable means known in the art.

In the present embodiment, power supply 70 produces an output voltage of approximately 24 V, which is below the supply's input voltage of 120 V. However, other output voltage levels and ranges are contemplated. For example, the output voltage can be below or above 24 V. The desired output voltage can depend on, among other things, the size of the low voltage circuit(s), and the number and type of light assemblies in the system.

An output of low voltage supply 70 is electrically connected to circuit 50. Circuit 50 comprises circuit means 51, such as conventional electrical wiring. However, other circuit means known in the art are also contemplated. In the present embodiment, wiring 51 is in the form of 18 AWG to 14 AWG gauge wire. It is to be appreciated however that wiring 51 can be of any other suitable gauge.

As shown in FIG. 1, in the present embodiment, a plurality of light assemblies 90 are electrically connected to wiring 51. A portion of circuit 50 forms a loop 52 having a hot wire 60 and a neutral wire 62. Each of the light assemblies is electrically connected to loop 52 in any suitable manner. In the present embodiment, a pair of wires extends from each light assembly 90 and are connected or spliced to wires 60, 62 by way of a pair of electrical connectors 54. In the present example, connectors 54 are in the form of 3M™ Scotchlok™ 560 connectors, which are used to electrically connect a wire end (a "tap") to a through wire (a "run"). Those skilled in the art will appreciate that any other suitable means can be used to connect a light assembly to a circuit.

Loop 52 is electrically connected to low power voltage supply 70 by way of a three-pole electrical connector 56 and a switch 58. In the present embodiment, connector 56 is a 3M™ Scotchlok™ 314 connector, which can be used to electrically connect two or three wires. Connector 56 and switch 58 are merely exemplary and are not meant to be limiting. For example, the one or more light assemblies of the present system can be controlled by any suitable means known in the art. This includes controlling the on/off of each assembly as well as other characteristics or parameters of each assembly, such as light intensity, colour (e.g. warm or cool light) to name a few.

A light assembly of the present system can be any suitable low voltage light assembly. The light assembly generally comprises one or more light elements and means to electrically connect the one or more elements to a low voltage circuit 50.

Figure 2:
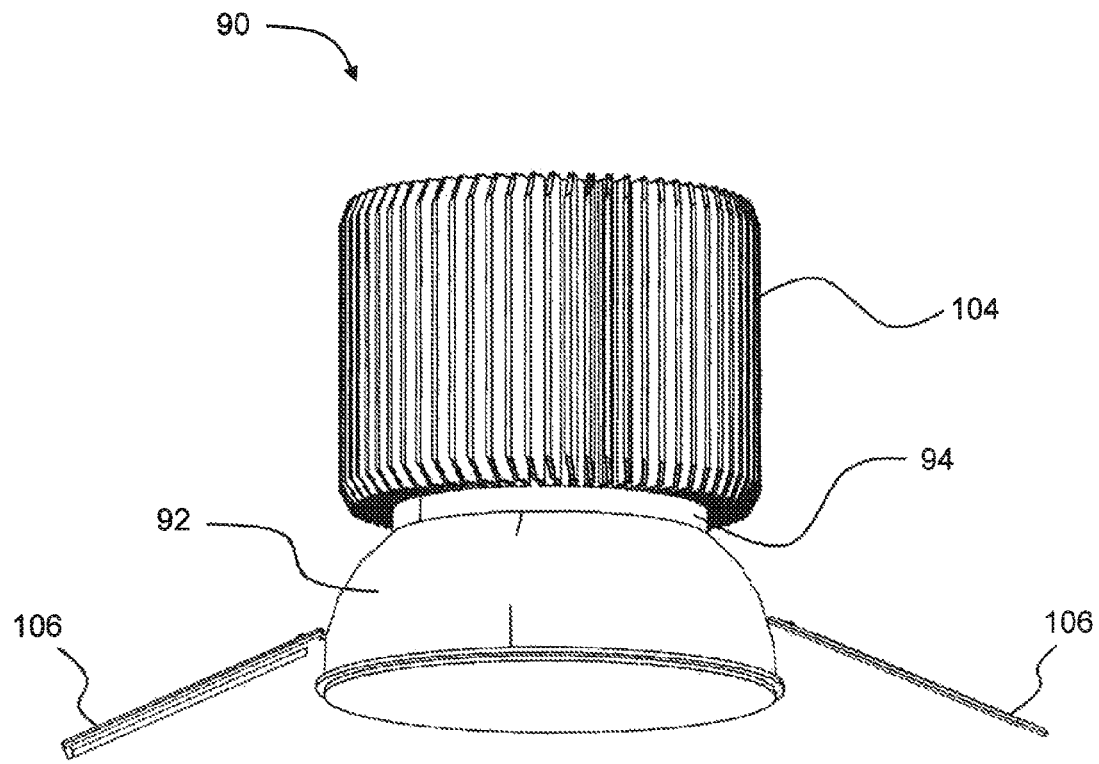
FIG. 2 is a perspective view of one embodiment of the present light assembly.
Figure 3:
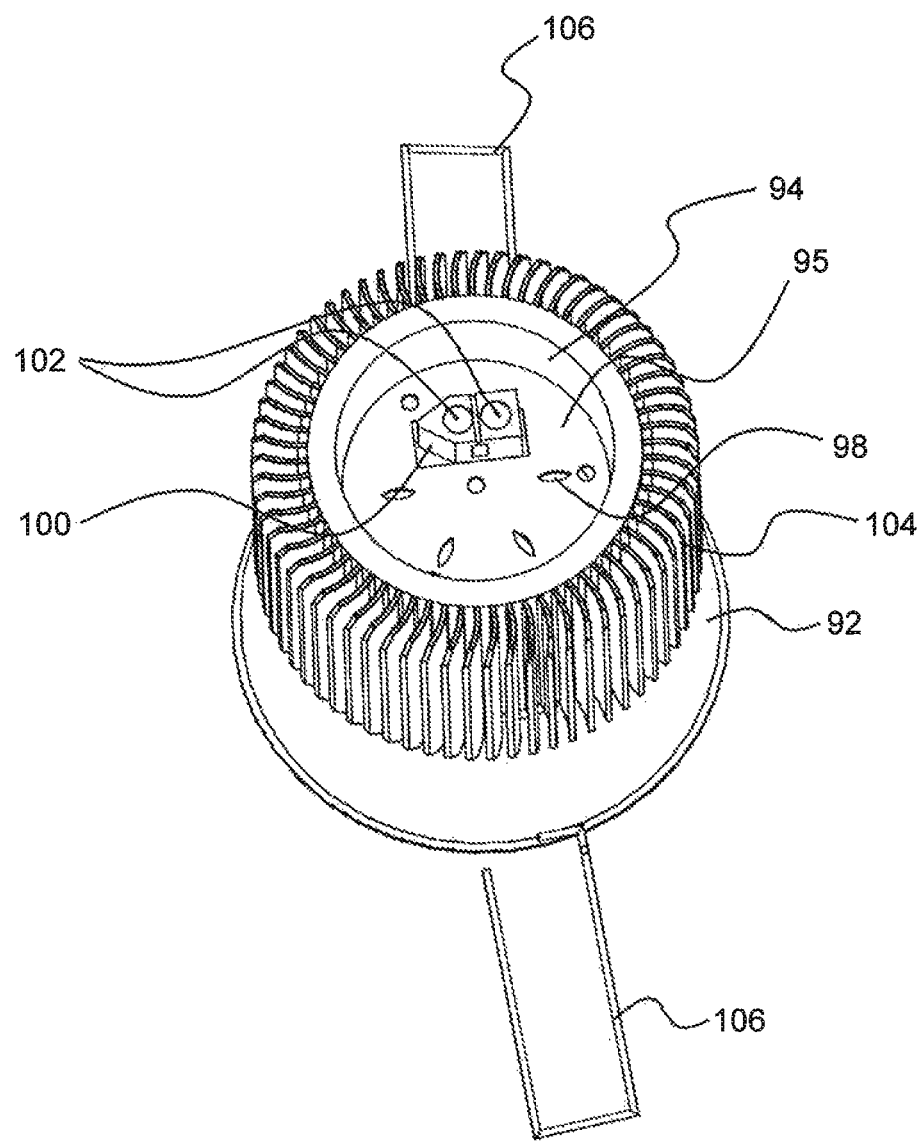
FIG. 3 is a perspective elevational view of the embodiment of the light assembly shown in FIG. 2.
Figure 4:
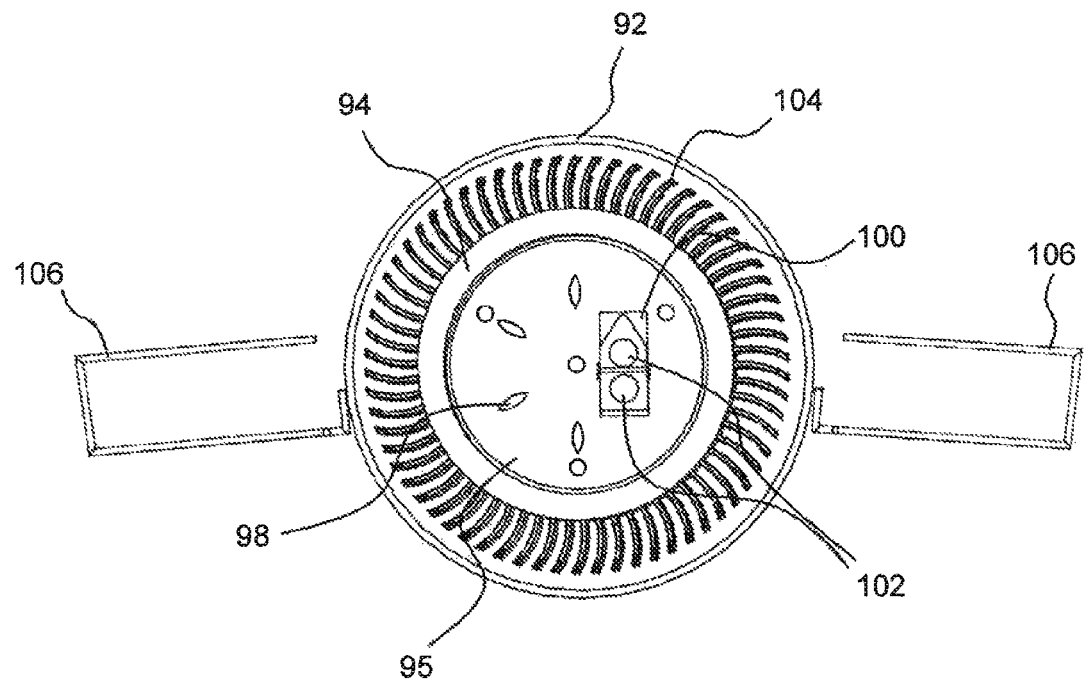
FIG. 4 is a top view of the embodiment of light assembly shown in FIG. 2.

Having reference to FIGS. 2 to 4, light assembly 90 of the present embodiment is now described. Light assembly 90 is shown in the form of an LED pot light. Light assembly 90 generally comprises a housing 94 for receiving one or more components of the light assembly, a reflector 92, and lighting elements (not shown), here in the form of LEDs. The lighting elements can be disposed at least partially within or proximate reflector 92. Light assembly 90 can also have a heat sink 104 for dissipating heat including any heat generated by the one or more lighting elements. In addition, the light assembly can have retaining means 106 for retaining the pot light against a structure, such as an opening in a ceiling.

Light assembly 90 can further include a modifier (not shown), which can be positioned within housing 94. Alternatively, the modifier can be suitably positioned outside of housing 94. As described above, the modifier can modify the characteristics (e.g. current, voltage, etc.) of the power on low voltage circuit 50 before it reaches light assembly 90. A modifier may be necessary where, for example, the voltage of circuit 50 needs to be further stepped down, or perhaps the current to the one or more lighting elements needs to be regulated. The modifier can also enable a desired operation of one or more lighting elements of a light assembly (e.g. colour, intensity, etc.). A modifier may also perform other functions, as will be appreciated by those skilled in the art.

In the present embodiment, the modifier is in the form of an LED driver, which steps down the voltage of low voltage circuit 50 from approximately 24 V to 11 V. In the present example, the low voltage power source supplies direct current (DC), and the input voltage of a light assembly 90 is approximately 11 V. However, it is to be appreciated that the modifier can be configured to have different input and output voltages, which will depend on the voltage of a low voltage circuit and an input voltage of a load to be connected to the circuit.

It is to be understood that a modifier need not be part of the light assembly. In other words, a modifier can be positioned at another location so long as it is electrically disposed between low voltage circuit 50 and light assembly 90. Those skilled in the art will appreciate that in some instances a modifier may not even be required.

Furthermore, as best shown in FIGS. 3 and 4, light assembly 90 can further include connection means 100 for providing an electrical connection between the assembly and a low voltage circuit. In at least one embodiment, as shown in FIGS. 3 and 4, connection means 100 can be in the form of a jack having a pair of electrical connectors 102. The jack can receive a corresponding plug or other connector for electrically coupling light assembly 90 to the low voltage circuit. Connection means can be of any other suitable type, including but not limited to screw-type terminals, binding post terminals, spring-loaded pinch jacks, and banana plug jacks.

As best shown in FIG. 3, a portion of housing 94, a portion of heat sink 104, or both, may extend above a cover 95 of the housing so that connection means 100 is at least partially recessed within light assembly 90. The recessed position of connection means 100 can serve to protect the connection means as well as the connection of any wires thereto. This can be useful during both the shipping and installation of the light assembly. Cover 95 of the housing may also comprise one or more vents 98 for allowing the passage of air into and out of housing 94.

Furthermore, although the circuit of the present embodiment has a loop 52, it is to be appreciated that the present system can have one or more low voltage circuits having any suitable layout and orientation. In other words, the particular circuit layout of the embodiment described herein is in no way meant to be limiting.

Additionally, in at least one embodiment, the system will have at least one AC to DC (not shown) converter for transforming AC power into DC. In the present embodiment, an AC to DC converter is located in power supply 70. Another option is to position an AC to DC converter at one or more light assemblies. Yet another option is to position one or more AC to DC converters at suitable locations in the one or more low voltage circuits connected to the output of the low voltage power supply so long as every light assembly requiring DC current only sees DC current. Other configurations are possible.

In addition to the above described system, a method of providing the present system is also contemplated.

Furthermore, the present disclosure also provides a DC to DC LED driver for driving one or more LEDs. This driver is hereinafter referred to as the "DC to DC driver".

The present DC to DC driver can be used in the present light assembly as described herein, or in any other suitable application to drive one or more LEDs.

The DC to DC driver can have its output or outputs configured to match the desired input characteristics of one or more LEDs. For example, the DC to DC driver can step down the voltage from an input source, such as a low voltage circuit, to one or more LEDs. The DC to DC driver can also regulate the current to the LEDs. In addition, the DC to DC driver can provide for or otherwise permit the dimming of the one or more LEDs.

In at least one embodiment, the DC to DC driver provides for a more gradual and constant dimming change rate relative to many existing drivers. Furthermore, in at least one embodiment, the DC to DC driver provides a more power-efficient dimming capability relative to many existing drivers.

Figure 5:
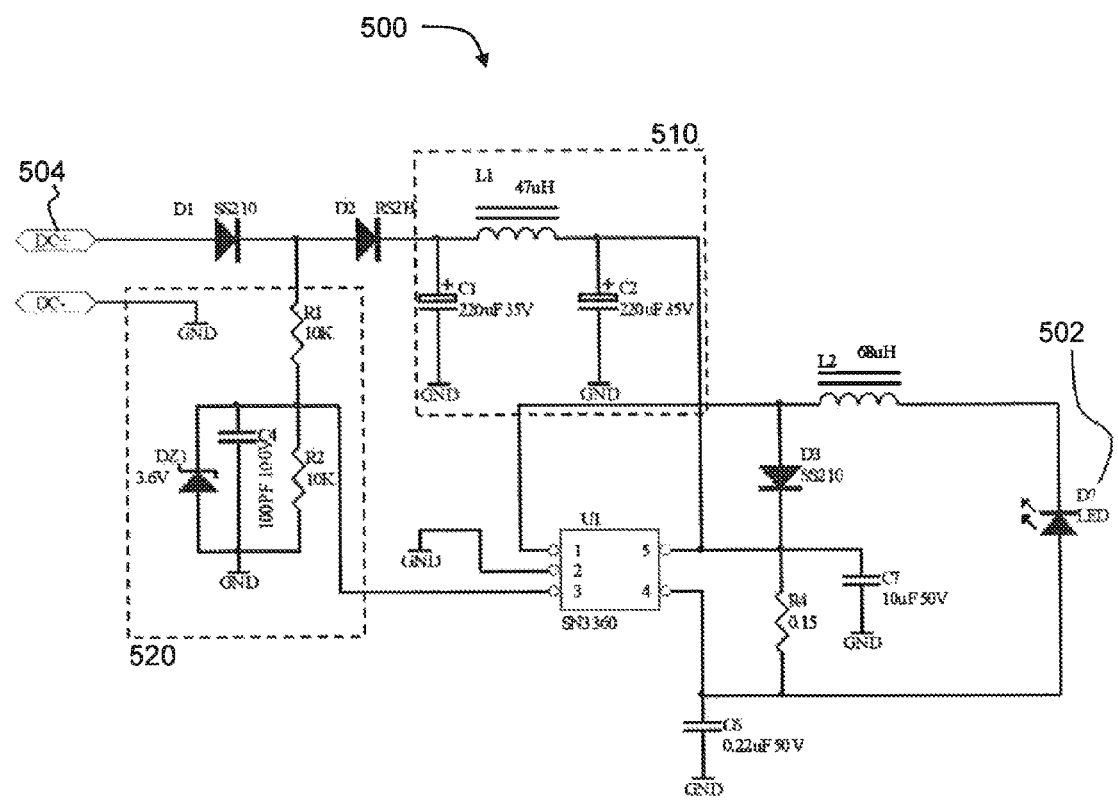
FIG. 5 is a circuit diagram representing one embodiment of the present DC to DC LED driver.

A schematic representation of one embodiment of the present DC to DC driver 500 is shown in FIG. 5. This particular embodiment utilizes an off the shelf LED driver chip, model number SN3360 made by SI-EN Technology of San Jose, Calif. The SN3360 chip is capable of driving one or more LEDs and operates from an input supply of between 6 V and 40 V. The chip also provides an externally adjustable output current of up to 1.2 A.

Although the present DC to DC driver is described with reference to an embodiment employing a SN3360 chip, the present DC to DC driver can be realized using another LED driver chip or other suitable driver circuitry, and the same or suitably modified additional circuit componentry shown in FIG. 5. In other words, the present DC to DC driver is not intended to be limited to a driver comprising a SN3360 chip. Furthermore, the present DC to DC driver is also not limited to drivers having the listed component values shown in FIG. 5, including the values of the resistors, capacitors, diodes, etc. The values of the various circuit components can be varied depending on the particular application and/or desired characteristics of the DC to DC driver.

In SN3360 chip, pin 1 is the output pin, or is also called the drain of power switch pin. Pin 2 is the ground pin. Pin 3 is a multi-function on/off and brightness control pin. Pin 4 is a current sensing pin, which can be used to define a nominal average output current of the chip. Pin 5 is the input voltage pin (6 V to 40 V). Additional information on the SN3360 chip is provided in the data sheet provided by the vendor of the chip.

Furthermore, DC to DC driver 500 can comprise a capacitor-input circuit 510, sometimes referred to as a pi circuit, for converting an input signal into a smoother DC signal. Capacitor-input circuit 510 can also be used for filtering out or otherwise suppressing unwanted signals and frequencies to input voltage pin 5. These signals include current ripple and reflected ripple current. Driver 500 can also comprise circuitry 520 for shaping the input characteristics to pin 3 in the SN3360 chip. For example, circuitry can include a voltage divider R1 and R2, as well as a Zener diode DZ1 for clamping the voltage at pin 3 at a desired level. In the embodiment shown in FIG. 5, Zener diode DZ1 is employed to clamp the input voltage at pin 3 to 3.6 V. However, the input voltage at pin 3 can be clamped at any other desirable voltage.

In operation, linear or near-linear LED dimming can be achieved by modifying an applied pulse width modulation (PWM) waveform to driver input 504. A modified version of the pulse width modulation (PWM) applied at driver input 504 is seen at multi-function on/off and brightness control pin 3 of the SN3360 chip. The modification of the input voltage, in the case of an applied PWM voltage the average voltage, to pin 3 can vary the output current at output pin 1, thereby providing dimming of the one or more LEDs 502.

In at least one other embodiment, LED dimming can be achieved by modifying an applied DC voltage to control pin 3. However, the use of a DC voltage may not be as power-efficient as the use of a PWM waveform voltage.

Figure 6A:
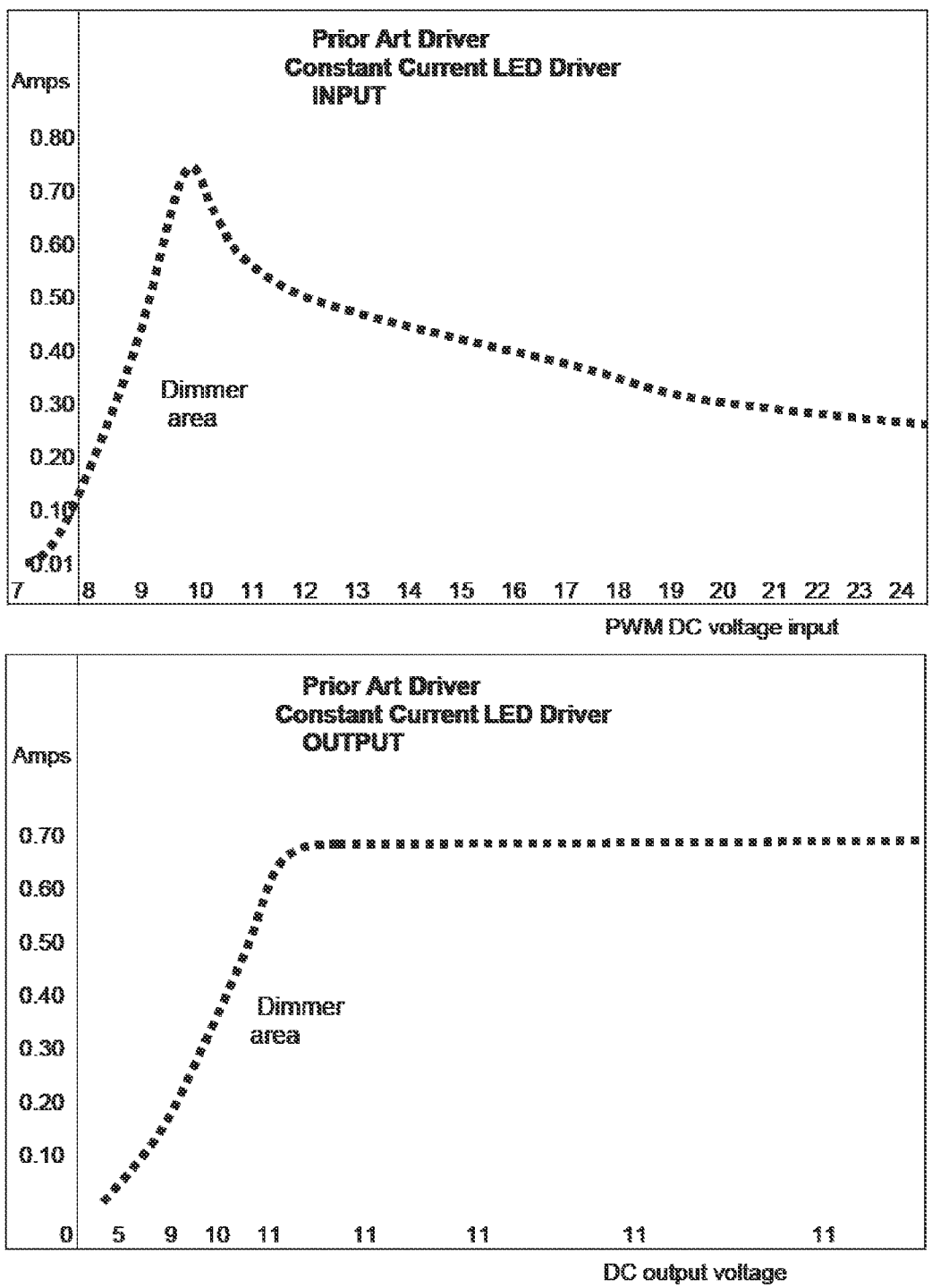
FIG. 6A shows an input graph and an output graph for a prior art LED driver.
Figure 6B:
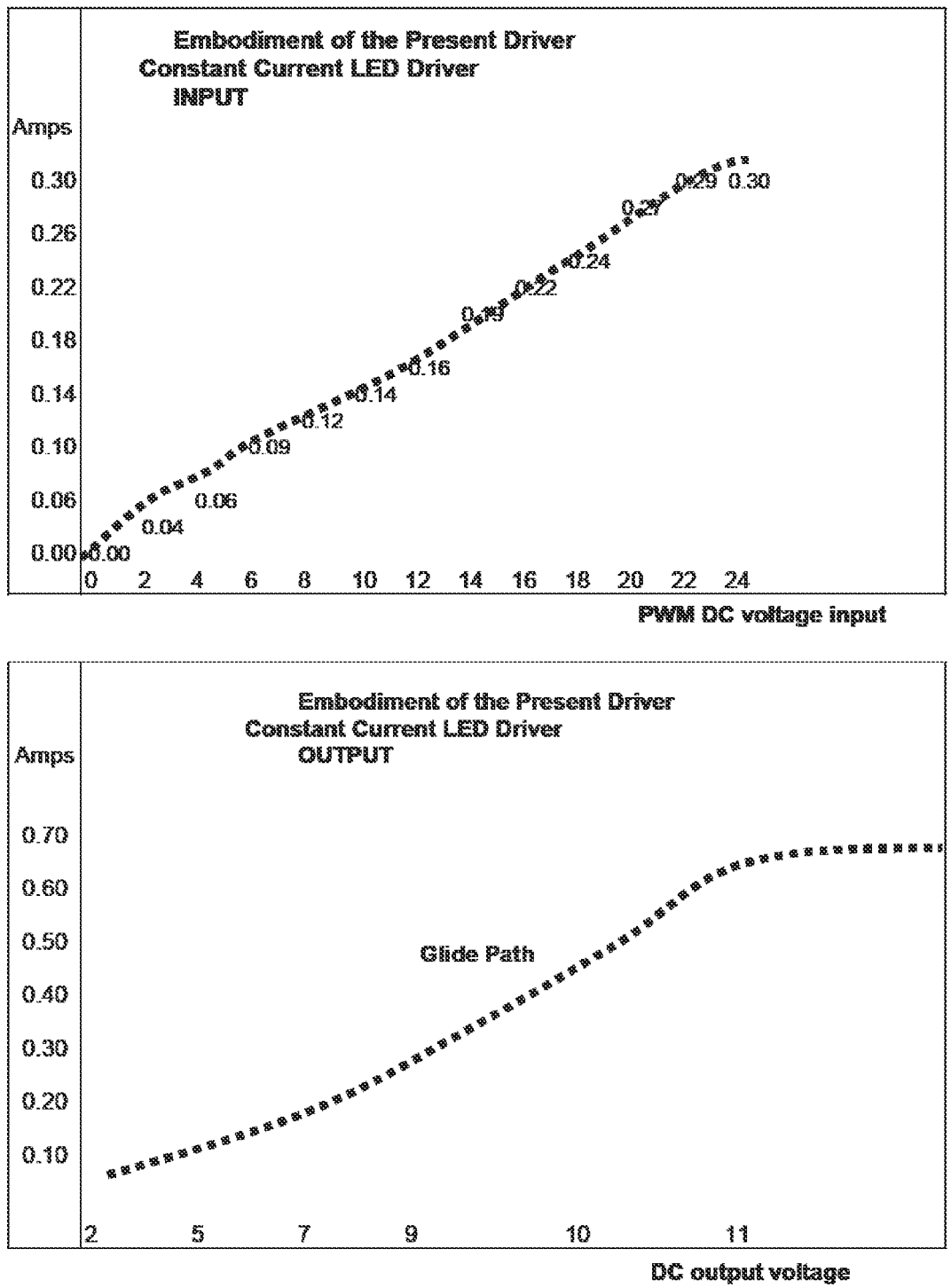
FIG. 6B shows an input graph and an output graph for the embodiment of the present DC to DC LED driver depicted in FIG. 5.

The performance of one embodiment of the present DC to DC driver relative to the performance of an existing (prior art) DC to DC LED driver is shown in FIGS. 6A and 6B. FIG. 6A consists of an input graph and an output graph showing the voltages and currents of a prior art LED driver. The input graph shows how the input current rises from approximately 0 A to 0.75 A (peak value) as the input PWM DC voltage is increased from approximately 7 V to 10 V. The rise of the input current curve between 7 V and 10 V is very steep. Similarly, the output graph shows how the output current rises very steeply from approximately 0 A to 0.7 A, and then flattens out completely as the input PWM DC voltage is increased from approximately 10 or 11 V to 24 V. Therefore the dimming region of the output curve is very steep and is located in a narrow band of the input PWM DC voltage (the band is approximately 7 V to 10 V as shown in the input graph of FIG. 6A).

In contrast, FIG. 6B shows the input and output characteristics of the embodiment of the present DC to DC LED driver shown in FIG. 5. Similarly to FIG. 6A, FIG. 6B consists of an input graph and an output graph showing the voltages and currents of the embodiment of the present DC to DC LED driver. Here the input graph shows that the input current rises gradually and more or less consistently from approximately 0 A to 0.3 A as the input PWM DC voltage is increased from approximately 0 V to 24 V. That is, the input current rises more or less consistently throughout the full range of the input voltage. This is in strict contrast to the input graph of the prior art driver shown in FIG. 6A. Furthermore, the output graph of FIG. 6B shows how the output current rises gradually and approximately consistently from approximately 0 A to 0.7 A as the input PWM DC voltage is increased from approximately 0 V to 24 V. Therefore, in contrast to the dimming region shown in the output graph of FIG. 6A, the dimming region of the output graph of FIG. 6B rises more gradually and consistently, and is also distributed over a much broader band of the input PWM DC voltage (the band is approximately 0 V to 24 V as shown in the input graph of FIG. 6B).

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

Moreover, the previous detailed description is provided to enable any person skilled in the art to make or use the present invention. Various modifications to those embodiments will be readily apparent to those skilled in the art, and the generic principles defined herein may be applied to other embodiments without departing from the spirit or scope of the invention described herein. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed:

1. An electrical lighting system capable of drawing power from a power source having a first voltage, the system comprising:
    at least one power supply having at least one input and one output, the input being electrically connectable to the power source, and the output providing a second voltage that is lower than the first voltage;
    at least one light assembly comprising at least one light emitting diode (LED);
    an LED driver having an input and an output, the output being electrically coupled to the light assembly, the LED driver modifying voltage at its output to be different than voltage at its input; and
    circuit means for electrically coupling the output of the at least one power supply to the input the LED driver.

2. The electrical system of claim 1 further comprising a current converter disposed between and electrically coupled to the power source and the at least one light assembly, the current converter for converting current between alternating current and direct current.

3. The electrical system of claim 2 wherein the power source is alternating current, and the current converter converts the alternating current into direct current.

4. The electrical system of claim 2 wherein the current converter is disposed at or proximate the at least one power supply.

5. The electrical system of claim 1 comprising a plurality of light assemblies.

6. The electrical system of claim 1 comprising a plurality of light assemblies each including at least one LED, and further comprising a plurality of LED drivers, wherein at least one LED driver is disposed between and electrically coupled to the circuit means and each of the plurality of light assemblies.

7. The electrical system of claim 1 wherein the voltage at the output of the LED driver is lower than the voltage at the input of the LED driver.

8. The electrical system of claim 1 wherein the LED driver is disposed at the light assembly.

9. The electrical system of claim 1 wherein the LED driver allows for the dimming of one or more LEDs.

10. The electrical system of claim 1 wherein the power supply is electrically connectable to the power source through an electrical outlet.

11. A method for providing a low voltage lighting system, the method comprising the steps of:
    electrically connecting an input of a power supply to a power source having a first voltage;
    electrically connecting an output of the power supply to an input of at least one light emitting diode (LED) driver by way of circuit means, the output of the power supply providing a second voltage that is lower than the first voltage;
    electrically connecting an output of the LED driver to at least one light assembly, the light assembly comprising at least one LED, the LED driver modifying voltage at its output to be different than voltage at its input.

12. The method of claim 11 further comprising the step of electrically coupling a current converter between and to the power source and the at least one light assembly, the current converter for converting current between alternating current and direct current.

13. The method of claim 11 wherein the LED driver allows for the dimming of one or more LEDs.

14. The method of claim 11 wherein the output voltage of the LED driver is lower than the input voltage of the LED driver.

* * * * *